United States Patent
Russ et al.

(10) Patent No.: US 8,814,520 B2
(45) Date of Patent: Aug. 26, 2014

(54) RESONANCE REDUCTION DEVICE FOR RAM AIR TURBINE

(75) Inventors: David Everett Russ, Rockford, IL (US); David G. Bannon, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 743 days.

(21) Appl. No.: 12/341,040

(22) Filed: Dec. 22, 2008

(65) Prior Publication Data

US 2010/0158698 A1 Jun. 24, 2010

(51) Int. Cl.
*A47C 7/74* (2006.01)

(52) U.S. Cl.
USPC ........... 416/170 R; 244/58; 188/39; 416/137; 416/44

(58) Field of Classification Search
USPC .............. 244/58; 416/170 R, 137, 44; 188/39
See application file for complete search history.

(56) References Cited

U.S. PATENT DOCUMENTS

| | | | |
|---|---|---|---|
| 4,411,596 A | 10/1983 | Chilman | |
| 2007/0237640 A1* | 10/2007 | Russ | 416/142 |
| 2008/0145222 A1* | 6/2008 | Schellings | 416/31 |
| 2009/0096213 A1* | 4/2009 | Berglund | 290/44 |
| 2010/0319983 A1* | 12/2010 | De Abreu et al. | 174/45 TD |

FOREIGN PATENT DOCUMENTS

EP    1580543 A2    9/2005

OTHER PUBLICATIONS

European Search Report for European Patent Application No. 09252865.2 completed Jun. 7, 2013.

* cited by examiner

*Primary Examiner* — Matthew Reames
(74) *Attorney, Agent, or Firm* — Carlson, Gaskey & Olds, P.C.

(57) ABSTRACT

A ram air turbine assembly includes a preferentially located mass that modifies the resonance frequency of the assembly so that vibration is reduced to desired levels. The example mass can be fixed in a specific location on the ram air turbine or can be deployable once the ram air turbine is moved to an operating position.

9 Claims, 10 Drawing Sheets

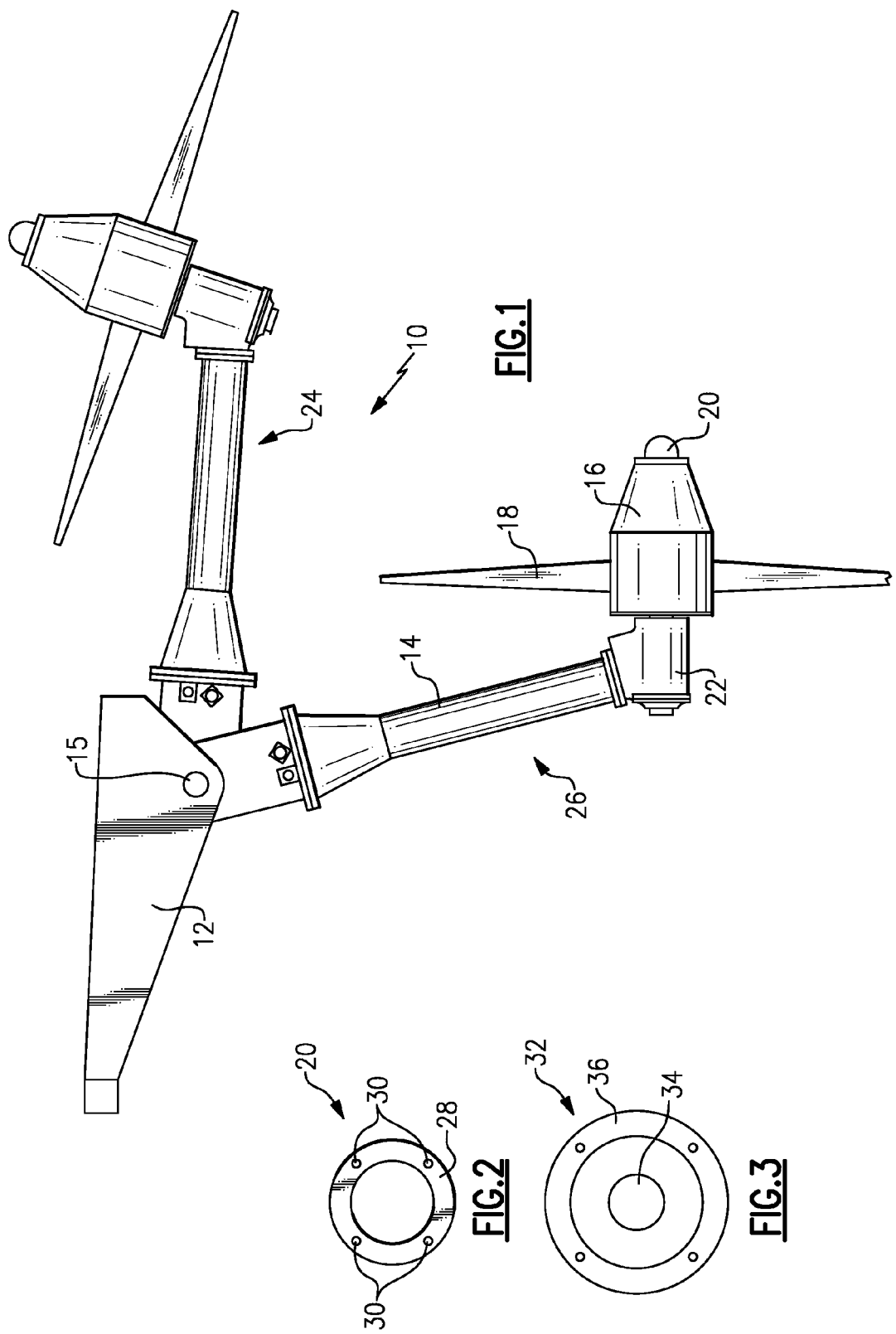

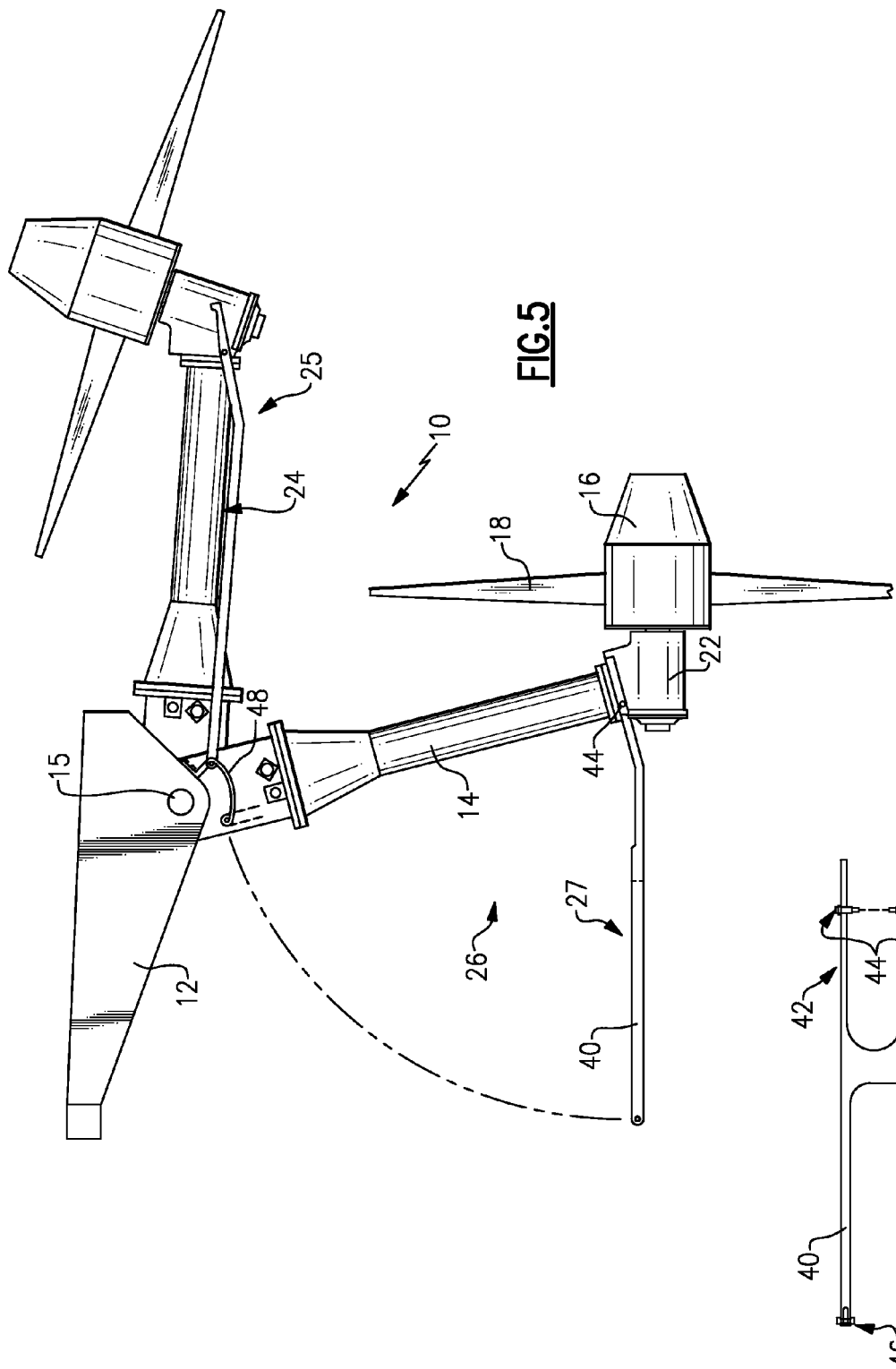

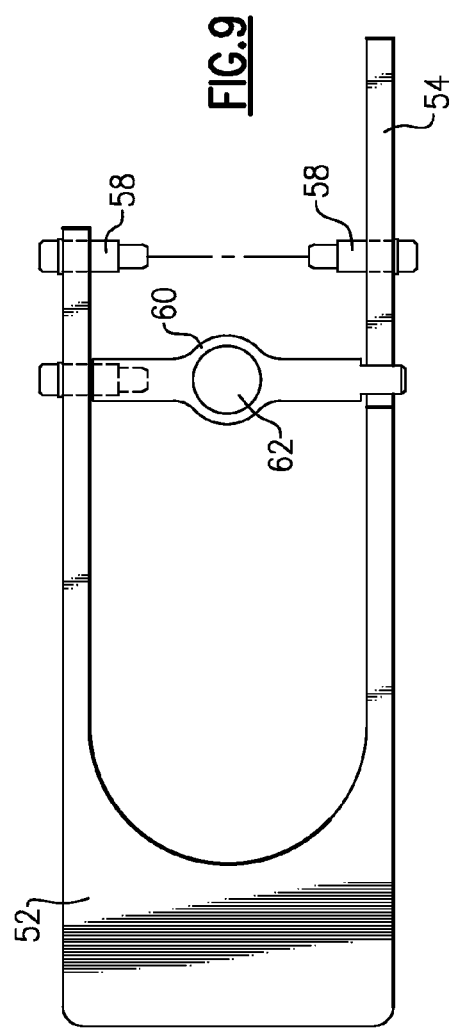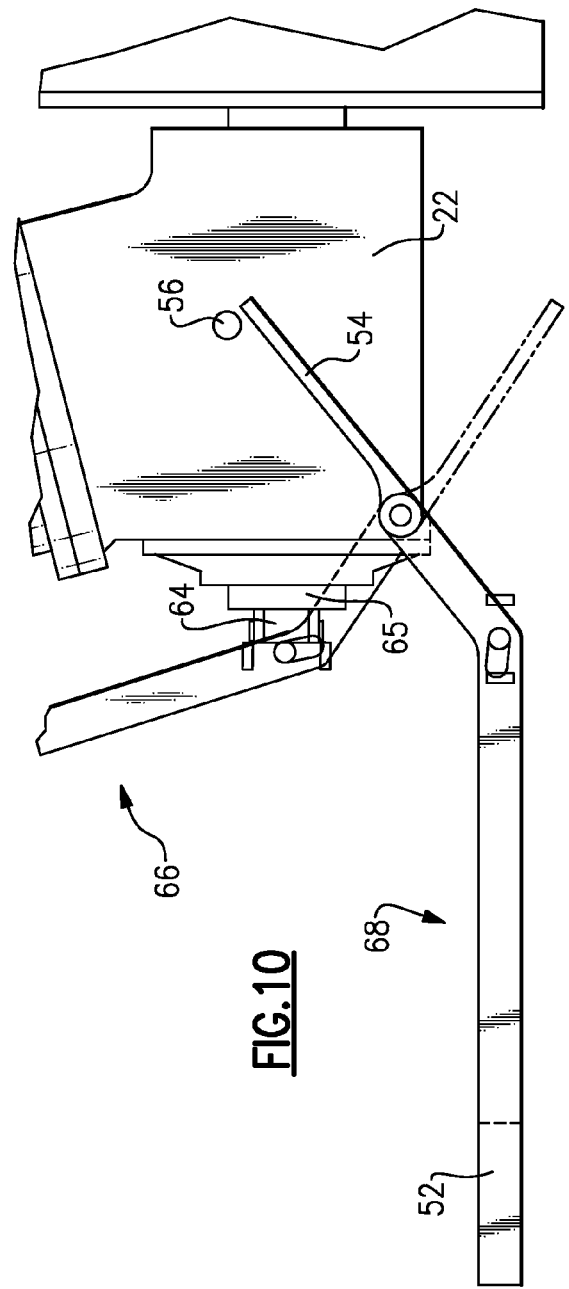

RESONANCE REDUCTION DEVICE FOR RAM AIR TURBINE

BACKGROUND OF THE INVENTION

This disclosure generally relates to ram air turbine assemblies. More particularly, this disclosure relates to a method and device for reducing structural resonances of a ram air turbine assembly.

A ram air turbine is utilized in aircraft as a backup power generator. Upon failure of the primary power generator, the ram air turbine is deployed. Deployment entails movement from a position within the aircraft to an extended position where the turbine blades are exposed to ram air outside of the aircraft. The turbine blades rotate a generator to provide electrical power, a pump to provide hydraulic power or both at the same time to aircraft systems in the absence of primary electrical and hydraulic power.

The ram air turbine is a back-up device and therefore is rarely used. However, although rarely used, it is important that the ram air turbine operate efficiently and properly when deployed. Conventional ram air turbines can encounter self-induced vibrations caused by imbalance of the turbine. The turbine imbalance is primarily caused by motion of the governor components and governor springs. The self-induced vibrations are amplified when there is a structural resonance within the operating speed range of the turbine. The vibration can degrade performance and therefore it is desirable to modify the structural resonance frequency so the ram air turbine is less susceptible to vibration.

SUMMARY OF THE INVENTION

An example ram air turbine assembly includes a preferentially located mass that modifies or reduces the magnitude of the resonance frequency to desired levels. The example mass can be fixed in a specific location on the ram air turbine or can be extended as the ram air turbine is moved to a deployed operating position.

The preferential location of a mass modifies the structural frequency of the ram air turbine structure to reduce undesired vibrations that can occur during operation. Further, the example masses can be movable to reduce the space required for storage of the ram air turbine. The preferential location of a mass at specific locations on the ram air turbine can reduce resonance amplitude or otherwise modify structural resonance frequencies, thereby reducing the need to increase structural features of the overall ram air turbine assembly.

These and other features of the present invention can be best understood from the following specification and drawings, the following of which is a brief description.

BRIEF DESCRIPTION OF THE DRAWINGS

FIG. 1 is a schematic view of an example ram air turbine assembly in deployed and stowed positions.

FIG. 2 is a top view of an example mass mountable to a turbine hub of the ram air turbine assembly.

FIG. 3 is a top view of another example mass mountable to a hub of the ram air turbine assembly.

FIG. 5, is a schematic view of an example ram air turbine assembly including a deployable mass.

FIG. 6 is a top view of the example deployable mass of FIG. 5.

FIG. 9 is a top view of the example deployable mass shown in FIG. 8.

FIG. 10 is a detail view of the example deployable mass of FIG. 9.

DETAILED DESCRIPTION OF THE PREFERRED EMBODIMENT

Figure 4:
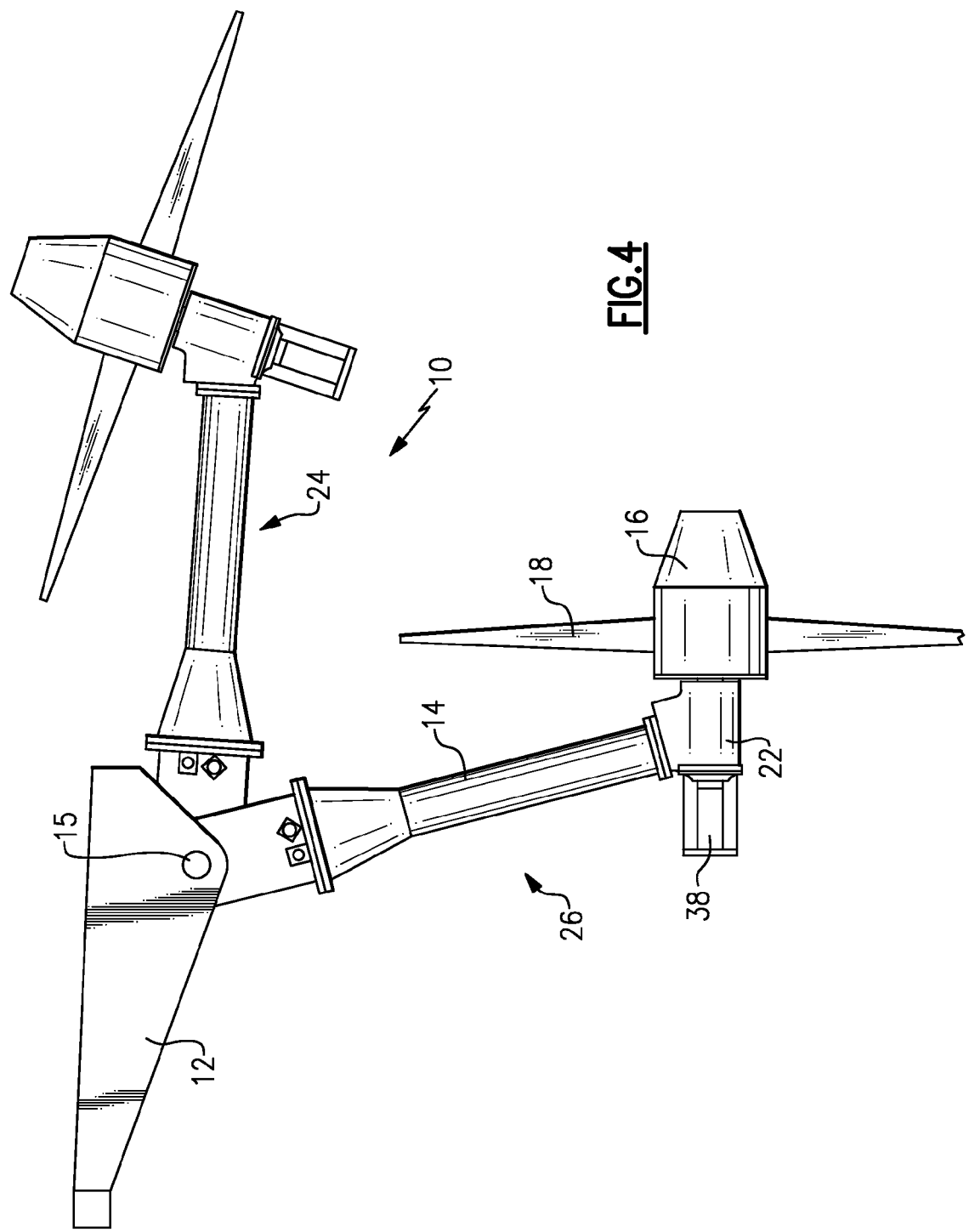
FIG. 4 is schematic view of the example ram air turbine assembly including a mass fixed to a support structure.

Referring to FIG. 1, a ram air turbine assembly 10 includes a deployable support structure 14 pivotally attached to a fixed structure 12. A rotating turbine hub 16 includes turbine blades 18 and is supported on a distal end of the support structure 14. The rotating hub 16 is supported on a housing 22 attached to the end of the support structure 14. The support structure 14 is movable about a pivot 15 between a stowed position 24 and a deployed position 26.

The example ram air turbine assembly 10 is shown and described by way of example, and other configurations and structures are within the contemplation of this invention. Further, the example ram air turbine assembly 10 operates to provide auxiliary power generation in the event that a primary power generating unit aboard an aircraft is not working as desired. In such a circumstance, the example ram air power generating assembly 10 is moved from the stowed position 24 to the deployed position 26 and the turbine blades 18 rotate responsive to the airflow. The rotating turbine blades 18 and hub 16 drive through mechanical means such as a mechanical transmission or hydraulic circuit, a generator and/or pump to provide electrical or hydraulic power.

Because the rotating central hub 16 and blades 18 are supported at the end of the support structure 14, a structural resonance frequency can be attained during operation. The structural resonance frequency can induce high oscillating loads that are transferred to the aircraft structure. Accordingly, the example ram air turbine 10 includes a preferentially located mass 20 that modifies and/or reduces the magnitude of the resonance response to acceptable levels. In the illustrated example, the mass 20 is mounted to the rotating hub 16. The location of the mass 20 is determined to shift away from the structural resonance frequency such that resonance frequency occurs only outside of desired operating ranges and conditions. The resulting shift of the structural resonance frequency reduces and/or eliminates vibrations that can occur within normal desired operating ranges.

Additionally, the mass 20 can mitigate the resonance frequency by providing a counterbalance function, shifting the location of a node point to the location where the unbalance occurs within the ram air turbine assembly 10. The node point is that point in the physical structure that does not move during vibration. An unbalanced force at this node point, such as a spring imbalance, eliminates the effect of the resonance to thereby reduce and/or eliminate the vibration.

In one example, the mass 20 is mounted to the front of the rotating hub 16. The amount of mass 20 provided is determined according to application specific parameters to tailor the resonance reduction to desired levels, or shift to desired frequencies.

Referring to FIG. 2, the example mass 20 includes a flange portion 28 with openings 30 for fasteners to attach the mass to the hub 16. The mass 20 itself is rounded and provided in a shape that limits negative aerodynamic effects on operation of the ram air turbine assembly 10. The mass 20 can be constructed of any compatible material to provide the desired weight in the defined space at the front of the hub 16. Further, it is within the contemplation of this invention to use alternate mass shapes and sizes.

Referring to FIG. 3, another mass 32 is illustrated and includes an insert 34 of material with a greater density to increase the weight without increasing the volume. The example mass 32 includes a flange 36 providing for attachment to the turbine hub 16. As appreciated, although openings 30 are shown, other fastening means as are known are within the contemplation of this invention. Additionally, the mass 32 could be an integral feature of the turbine hub 16.

Referring to FIG. 4, another example ram air turbine assembly 10 includes an example mass 38 attached to a rear portion of the housing 22. The example mass 38 is substantially cylindrical and extends outward from the housing 22. The mass 38 may also be any desired shape such as rectangular or any other shape as is desired to provide the desired dampening characteristics and also to ease storability. such as for example The location of the mass 38 on the housing 22 provides another example location that can be utilized to modify the resonance frequency of the structure without increasing the size and weight of the structural components of the ram air turbine assembly 10.

Referring to FIG. 5, a deployable mass 40 is shown that folds into a non-extended position 25 when the ram air turbine assembly 10 is in the stowed position 24. Because the mass 40 is movable, less space is required when in the stowed position, such that modifications are not required to the storage space required for the overall assembly 10. Further, because the mass 40 is stowable, it may be longer than a comparable fixed mass to extend outward a further distance from the housing 22. The added distance provides for a reduced weight of the mass 40 while still providing the desired moment of inertia to suitably alter the structural resonance.

The deployable mass 40 is pivotally attached to and rotatable about the pivot 44. The example pivot 44 is disposed on the housing 22, but may be disposed on the structure 14. The mass 40 is held in place against the structure 14 by a latch 48.

Referring to FIG. 6, the mass 40 includes a tab 46 that engages the latch 48 to secure the mass 40 until a desired deployed position 26 of the assembly 10 is reached. Once the desired deployed position of the ram air turbine assembly 10 is obtained, the tab 46 moves free of the latch 48 and allows the mass 40 to fall free to an extended position 27.

Figure 7:
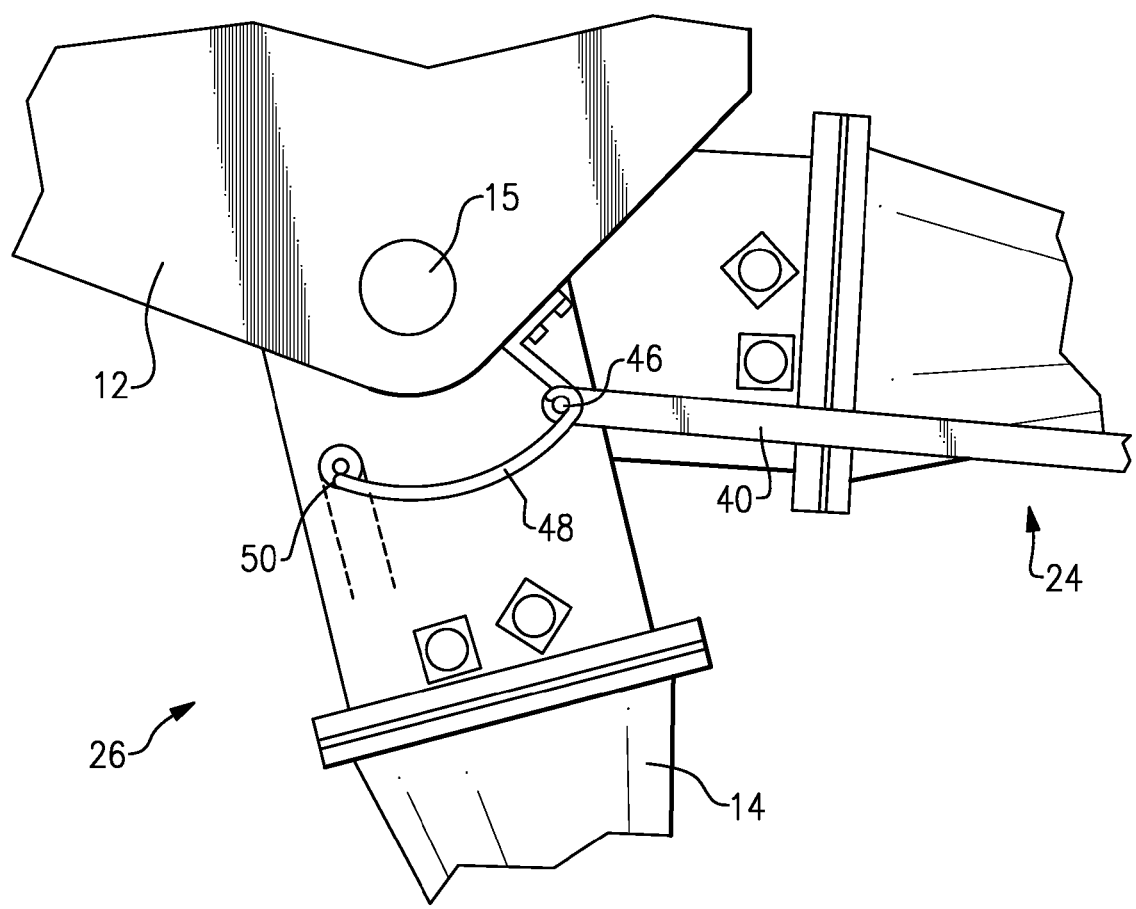
FIG. 7 is a side view of an example latch for the deployable mass in both a stowed and deployed position.

Referring to FIG. 7, an enlarged view of the latch 48 illustrates movement of the tab 46 along the latch 48 to a position at the end 50 that releases the tab 46 and provides for the mass 40 to fall to the deployed position.

Figure 8:
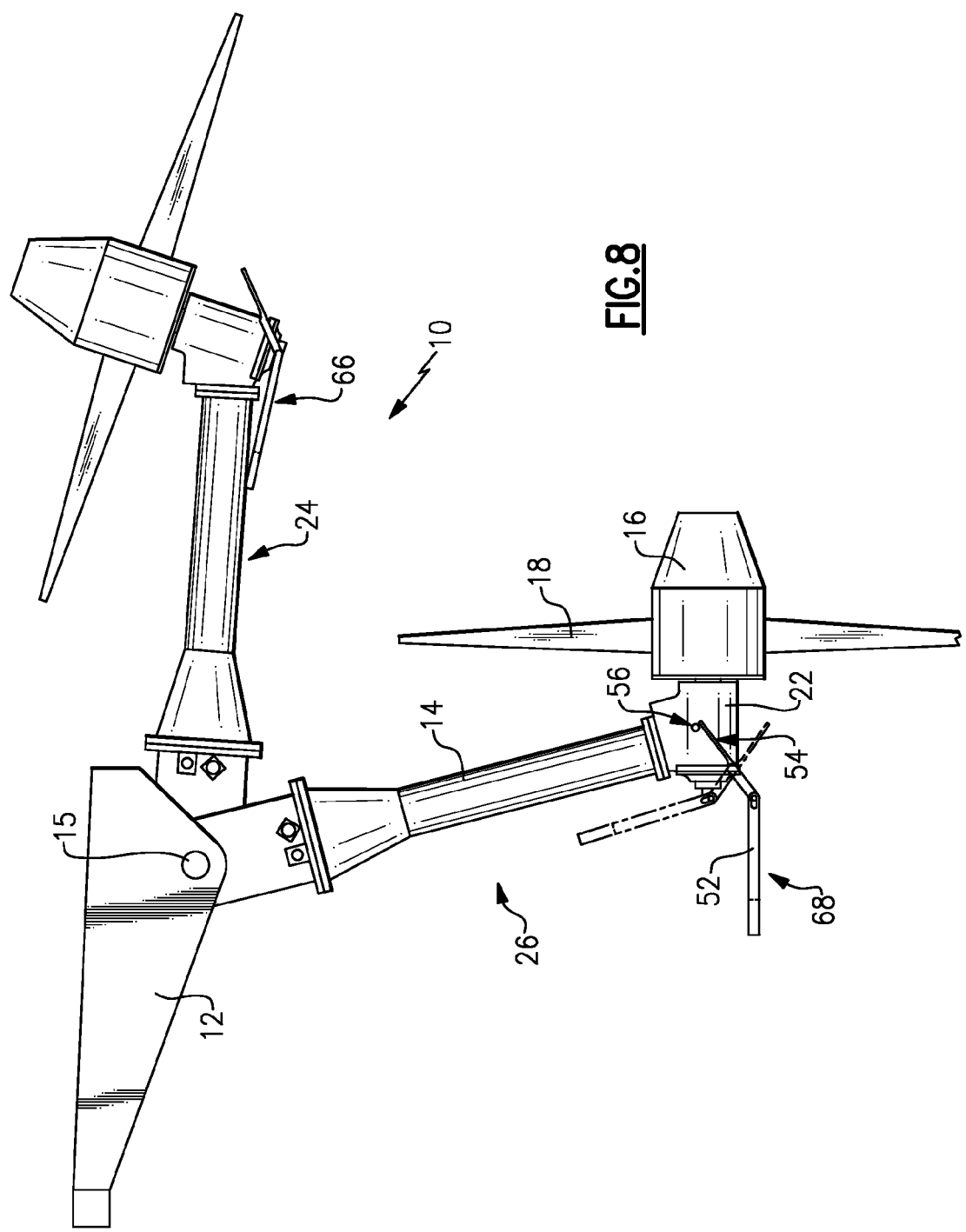
FIG. 8 is a schematic view of the example ram air turbine assembly including another deployable mass in both the stowed and deployed positions.

Referring to FIGS. 8-10, another deployable mass 52 is pivotally attached to the housing 22 and is held in place by a nut 64 on the turbine drive shaft 65. In this example, the deployable mass 52 remains in the non-extended position 66 until the drive shaft 65 begins rotating within the nut 64. Rotation of the shaft 65 disengages the mass 52 so that it may fall into the desired extended position 68.

The deployable mass includes a latch 60 with an opening 62 that engages the nut 64. The mass 52 is pivotally attached by way of pivot members 58 to the housing 22. In the stowed non-extended position 25 of the mass 52, the latch 60 is engaged to the nut 64. Engagement of the latch 60 to the nut 64 can be a slight interference fit to hold the mass 52 against the supporting structure until movement breaks the interference fit to release the mass 52. Further, the latch 60 may include an integral threaded member that unthreads upon rotation of the shaft 65.

Once the assembly 10 is deployed turbine drive shaft 65 begins rotating and disengages from nut 64, the latch 60 and nut 64 is freed and the deployable mass 52 falls into the extended position 68. An arm 54 extends outwardly on an opposite side of the pivot 58 relative to the mass 52. The arm 54 extends at an angle relative to the mass 52 to engage a stop 56. Once the arm 54 engages the stop 56, the mass 52 is stopped in the desired extended position 68. The angle of the arm 54 provides for the positioning of the mass 52 once the latch 60 is free of the nut 64.

Figure 11:
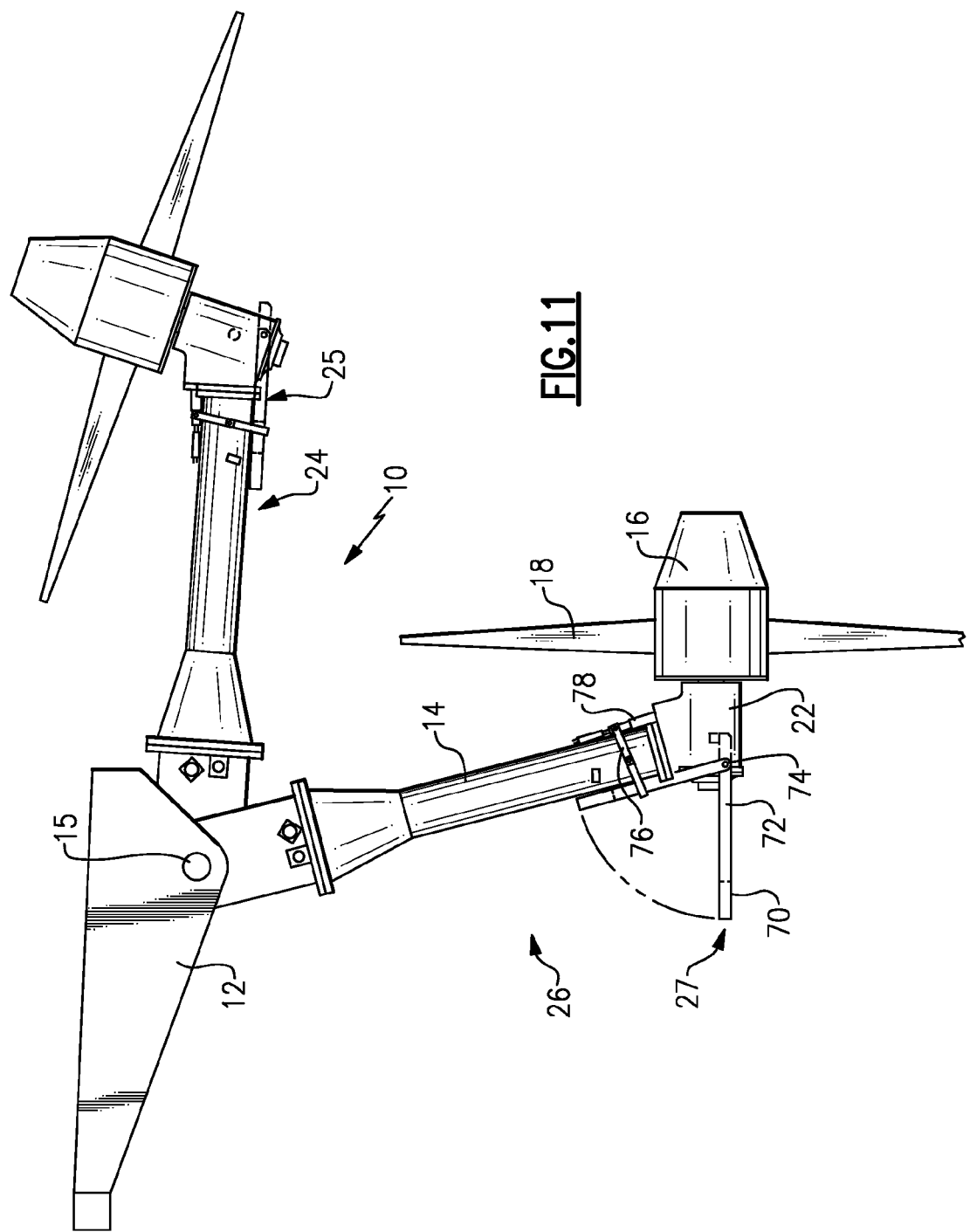
FIG. 11 is a schematic view of the example ram air turbine assembly including another deployable mass.

Referring to FIG. 11, another deployable mass 70 is held in the non-extended position 25 by a latch member 76. The latch member 76 is a pivot arm that moves responsive to an actuator 78. The example actuator is a cylinder that pushes a shaft upward to move an opposite end of the latch member 76 downward and free of the mass 70. The mass then falls freely into the desired extended position 27.

Figure 13:
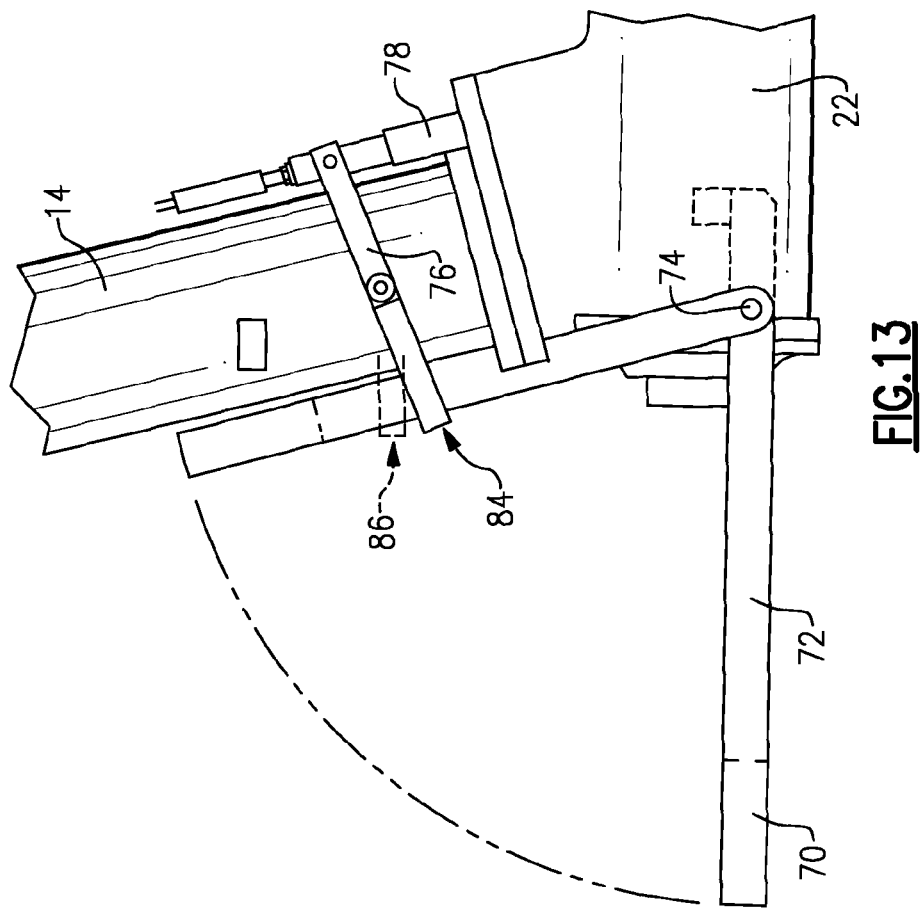
FIG. 13 is a detail schematic view of the deployable mass of FIG. 11.
Figure 12:
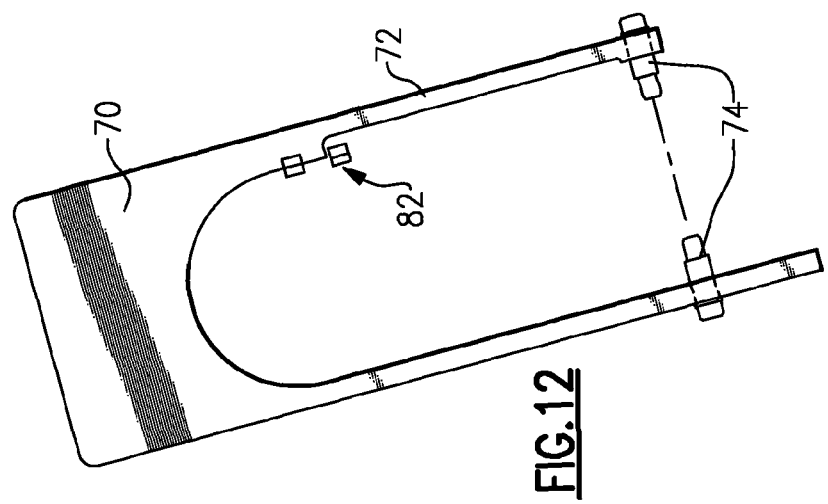
FIG. 12 is a detail view of the deployable mass of FIG. 11.
Figure 14:
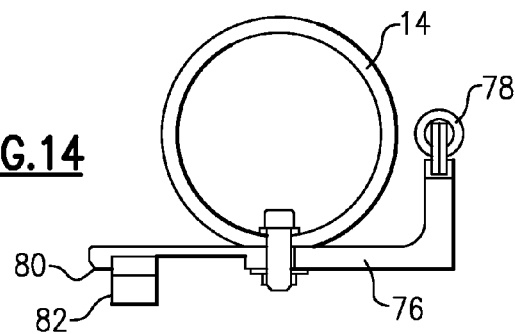
FIG. 14 is a cross-sectional view of an example latch mechanism for the deployable mass.

Referring to FIGS. 12-14, the mass 70 includes arms 72 that are attached to the housing 22 by pivot members 74. The mass 70 and arms 72 are shaped to include a catch portion 82. The example catch portion 82 is a step that is engaged by a tab 80 on the latch member 76. The latch member 76 can pivot about a pivot point 75. The actuator 78 is disposed on an opposite side of the latch member 76 and structure 14 from the mass 70. The example actuator 78 pushes upward on one end of the latch member 76 to cause a corresponding downward movement of the tab 80 to release the catch portion 82 and allow the mass 70 to fall into the desired extended position.

Figure 15:
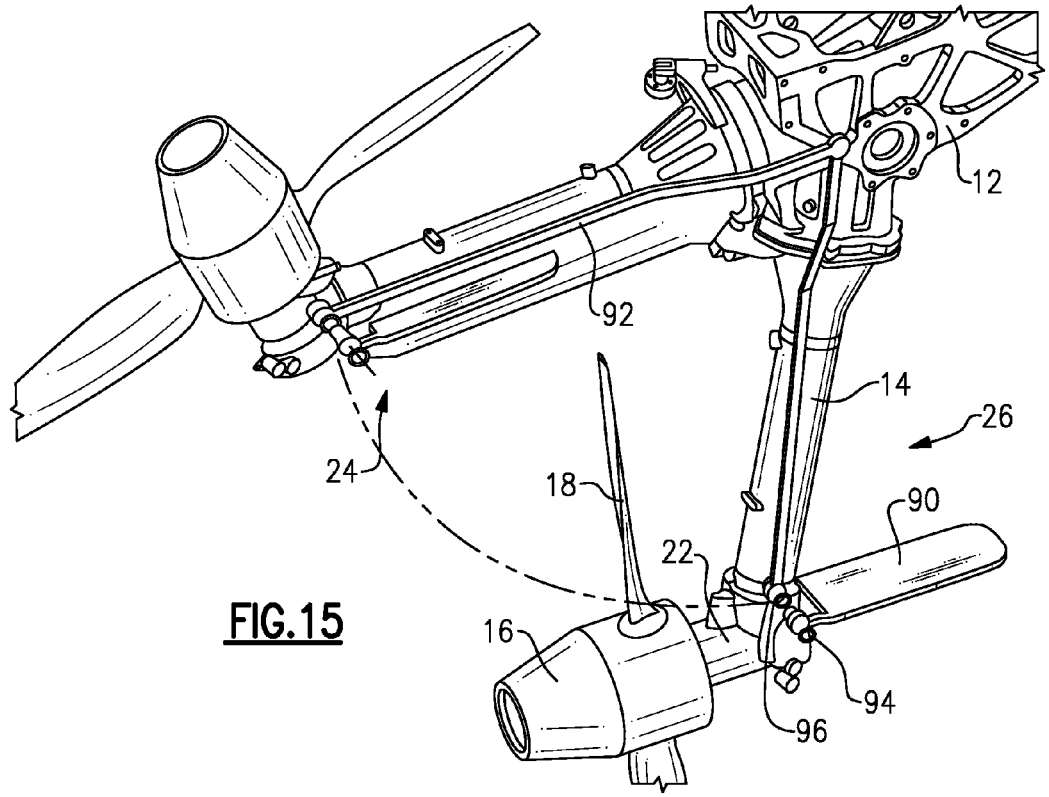
FIG. 15 is another example ram air turbine assembly including a deployable mass movable by a linkage.
Figure 16:
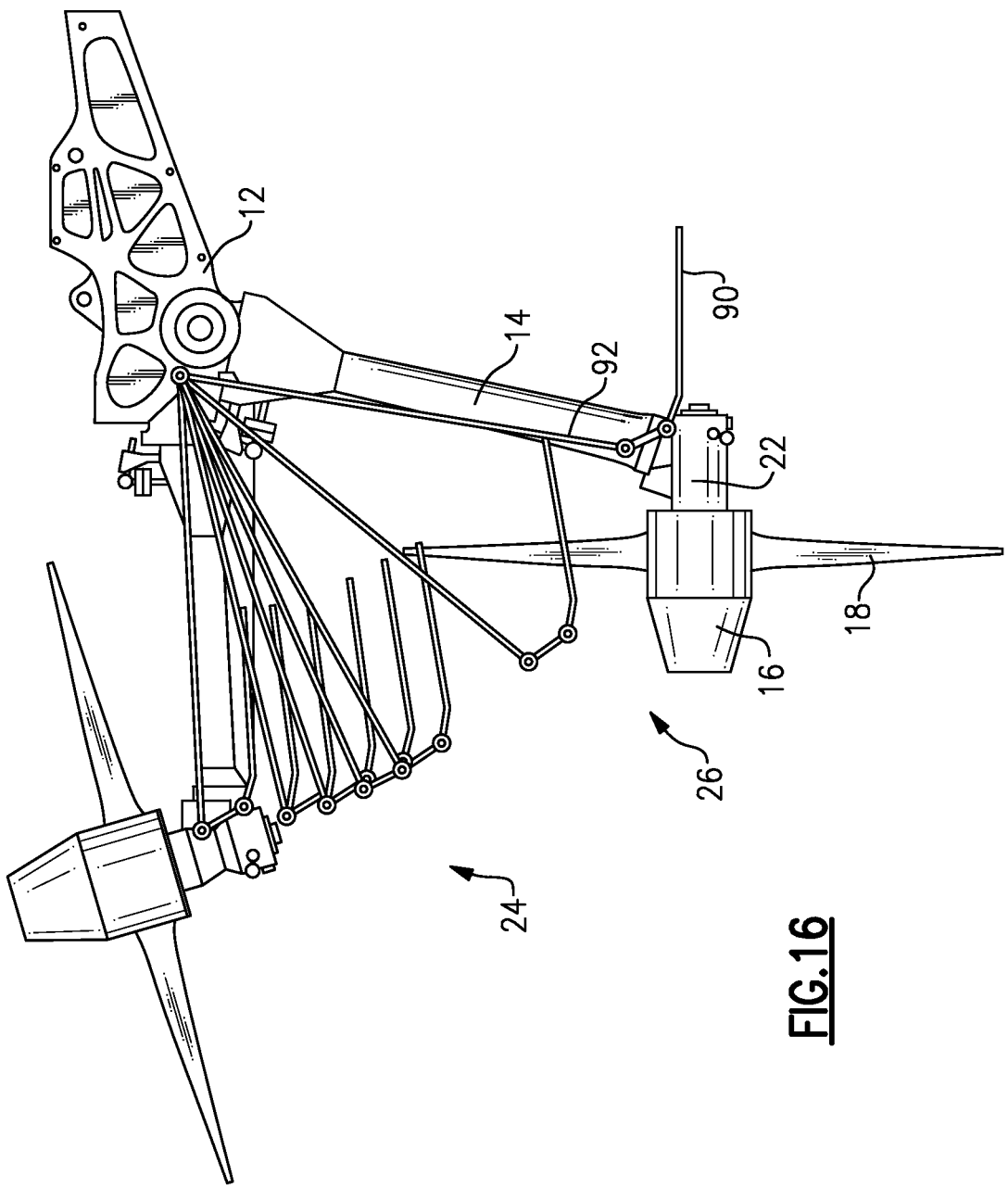
FIG. 16 is a schematic view illustrating movement of the ram air turbine and deployable mass from a stowed position to a deployed position.

Referring to FIGS. 15 and 16, another deployable mass 90 is attached to the housing 22 and is moved between the non-extended and extended positions by a mechanical linkage 88. The example linkage 88 is a four bar linkage and comprises a first link 92 attached to second link 94 at the pivot 96. The second link 94 is in turn pivotally attached to the mass 90. In this example, the mass 90 extends together with deployment of the ram air turbine assembly 10. As the support structure 14 pivots downwardly, the first link 92 causes a corresponding pivoting movement of the second link 96, which in turn results in movement of the mass 90 to the extended position.

The resulting extension of the mass 90 is controlled throughout and can be reversed to move from the extended position back to the non-extended position automatically. Accordingly, the lengths and pivot points of the links 92, 94 and 96 are adjusted to provide the desired non-extended and extended positions of the mass 90, and the corresponding movement therebetween.

Accordingly, the preferential location of masses described by way of example modifies the resonant structural frequency of the ram air turbine structure to reduce vibration in desired operational ranges. Further, the example masses can be movable so additional space is not required for storage of the ram air turbine. The preferential location of mass at specific locations on the ram air turbine shift structural resonance frequencies away from vibration frequencies that occur during normal operating conditions, thereby reducing the need to increase structural features of the overall ram air turbine assembly 10.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A ram air turbine assembly comprising:
   a turbine comprising a rotatable turbine hub and turbine blades extending from the turbine hub;
   a pivot;
   a support structure supporting the turbine, wherein the support structure is movable about the pivot between a stowed position and a deployed position; and
   a mass including a flange and an insert, wherein the insert includes a greater density than the flange, the flange of the mass attached to the rotatable turbine hub for adjusting a resonance frequency of the ram air turbine assembly, wherein the mass is spaced apart from the pivot and extends outward from the turbine hub.

2. The assembly as recited in claim 1, wherein the mass is located on the turbine hub.

3. A ram air turbine assembly comprising:
   a turbine comprising a turbine hub and turbine blades extending from the turbine hub;
   a support structure supporting the turbine, wherein the support structure is movable between a stowed position and a deployed position; and
   a mass including a flange and an insert supported by the flange, wherein the flange is attached to the support structure on a side opposite the turbine hub.

4. The assembly as recited in claim 2, wherein the turbine hub includes a front portion and the flange of the mass is mounted to the front portion of the turbine hub.

5. The assembly as recited in claim 4, wherein the insert comprises a rounded outer profile for mitigating aerodynamic effects.

6. The assembly as recited in claim 5, wherein the flange is attached to the rounded outer profile of the insert, the flange providing for attachment to a rotating portion of the turbine hub.

7. The assembly as recited in claim 3, wherein the insert extends a distance rearward from the support structure.

8. The assembly as recited in claim 3, wherein the insert is substantially cylindrical and extends outward from the support structure.

9. The assembly as recited in claim 3, wherein the insert includes a greater density than other portions of the mass.

* * * * *